United States Patent
Gupta et al.

(10) Patent No.: US 10,499,430 B2
(45) Date of Patent: Dec. 3, 2019

(54) METHOD AND APPARATUS FOR OPERATING A DEVICE ON A LICENSED SPECTRUM AND AN UNLICENSED SPECTRUM

(71) Applicant: Motorola Mobility LLC, Chicago, IL (US)

(72) Inventors: Ranjeet Gupta, Naperville, IL (US); James Van Bosch, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 124 days.

(21) Appl. No.: 15/649,603

(22) Filed: Jul. 13, 2017

(65) Prior Publication Data

US 2019/0021115 A1    Jan. 17, 2019

(51) Int. Cl.
*H04W 74/08* (2009.01)
*H04W 16/10* (2009.01)
(Continued)

(52) U.S. Cl.
CPC ......... *H04W 74/0816* (2013.01); *H04L 1/201* (2013.01); *H04L 5/001* (2013.01);
(Continued)

(58) Field of Classification Search
None
See application file for complete search history.

(56) References Cited

U.S. PATENT DOCUMENTS 9,432,840 B2 *   8/2016   Traynor ............ H04W 52/0254
9,510,133 B2    11/2016   Gupta et al.
(Continued)

FOREIGN PATENT DOCUMENTS

WO   WO2015180075 A1   12/2015
WO   WO2016012578 A1    1/2016
(Continued)

OTHER PUBLICATIONS

Wong, Notice of References Cited, PTO-892, U.S. Appl. No. 15/341,914, U.S. Patent and Trademark Office, dated Apr. 6, 2018.
(Continued)

*Primary Examiner* — Saumit Shah
(74) *Attorney, Agent, or Firm* — Loppnow & Chapa; Matthew C. Loppnow (57) ABSTRACT

A method and apparatus operate a device on a licensed spectrum and an unlicensed spectrum. The device can operate on a Wireless Wide Area Network (WWAN) band via a WWAN base station using a WWAN Radio Access Technology (RAT). The device can connect to a Wireless Local Area Network (WLAN) base station using the WWAN RAT on a WWAN RAT WLAN band operating on a WLAN frequency and can connect to a WLAN access point using a WLAN RAT on a WLAN RAT band operating on a WLAN frequency. The WWAN RAT WLAN band can be determined to be the same band as the WLAN RAT band. A signal metric of the WWAN RAT WLAN band or the WLAN RAT band can be compared to a threshold. Whether to disable communications on the WWAN RAT WLAN band or the WLAN RAT band can be determined based on comparing the signal metric of the WWAN RAT WLAN band or the WLAN RAT band to a threshold. Communications of the WWAN RAT WLAN band or the WLAN RAT band can be disabled if the communications on the WWAN RAT WLAN band or the WLAN RAT band should be disabled.

18 Claims, 7 Drawing Sheets

(51) Int. Cl.
- *H04L 5/00* (2006.01)
- *H04W 72/12* (2009.01)
- *H04L 1/20* (2006.01)
- *H04L 1/18* (2006.01)
- *H04W 24/02* (2009.01)
- *H04W 16/14* (2009.01)
- *H04W 88/06* (2009.01)

(52) U.S. Cl.
CPC ............ *H04L 5/006* (2013.01); *H04L 5/0032* (2013.01); *H04W 16/10* (2013.01); *H04W 72/1215* (2013.01); *H04L 1/1812* (2013.01); *H04L 5/0042* (2013.01); *H04L 5/0069* (2013.01); *H04L 5/0098* (2013.01); *H04W 16/14* (2013.01); *H04W 24/02* (2013.01); *H04W 72/12* (2013.01); *H04W 72/1231* (2013.01); *H04W 74/0808* (2013.01); *H04W 88/06* (2013.01)

(56) References Cited

U.S. PATENT DOCUMENTS

| | | |
|---|---|---|
| 2004/0165563 A1 | 8/2004 | Hsu et al. |
| 2008/0096565 A1 | 4/2008 | Jin |
| 2008/0101291 A1 | 5/2008 | Jiang |
| 2010/0091731 A1 | 4/2010 | Kim |
| 2013/0083783 A1 | 4/2013 | Gupta |
| 2013/0203432 A1 | 8/2013 | Wang |
| 2014/0043979 A1 | 2/2014 | Etemad et al. |
| 2014/0133294 A1 | 5/2014 | Horn |
| 2014/0185494 A1 | 7/2014 | Yang |
| 2014/0274105 A1 | 9/2014 | Wang |
| 2014/0354336 A1 | 12/2014 | Syllaios |
| 2015/0029879 A1 | 1/2015 | Chou |
| 2015/0103812 A1 | 4/2015 | Zhao et al. |
| 2015/0117357 A1 | 4/2015 | Ozturk |
| 2015/0223115 A1 | 8/2015 | Liang et al. |
| 2015/0365972 A1 | 12/2015 | Seok |
| 2015/0382342 A1 | 12/2015 | Seok |
| 2016/0165604 A1* | 6/2016 | Khawer ................ H04W 16/14 455/452.1 |
| 2016/0277064 A1 | 9/2016 | Waxman |
| 2017/0064745 A1* | 3/2017 | Kephart, Jr. .......... H04W 76/10 |
| 2017/0311242 A1 | 10/2017 | Puranik |
| 2018/0035438 A1* | 2/2018 | Pao ................... H04W 72/0413 |
| 2018/0242340 A1 | 8/2018 | Pu et al. |

FOREIGN PATENT DOCUMENTS

| | | |
|---|---|---|
| WO | WO2016089801 A1 | 6/2016 |
| WO | WO2018052734 A1 | 3/2018 |

OTHER PUBLICATIONS

Wong, Notice of References Cited, U.S. Appl. No. 15/341,914, U.S. Patent and Trademark Office, dated Nov. 1, 2018.

Cundy, Search Report under Section 17, GB Application No. GB1717533.2, Intellectual Property Office of the United Kingdom, dated Apr. 20, 2018.

Wong, PTO-892, Notice of References Cited, U.S. Appl. No. 15/341,900, U.S. Patent and Trademark Office, dated Aug. 3, 2018.

Huynh, Notice of References Cited, PTO-892, U.S. Appl. No. 15/269,874, U.S. Patent and Trademark office, dated Mar. 26, 2018.

Wong, Notice of References Cited, U.S. Appl. No. 15/341,900, U.S. Patent and Trademark Office, dated Dec. 13, 2018.

Huynh, Notice of References Cited, U.S. Appl. No. 15/269,874, U.S. Patent and Trademark Office, dated Jun. 12, 2019.

* cited by examiner

METHOD AND APPARATUS FOR OPERATING A DEVICE ON A LICENSED SPECTRUM AND AN UNLICENSED SPECTRUM

CROSS-REFERENCE TO RELATED APPLICATIONS

This application is related to an application entitled "Method and Apparatus for Operating a Device on a Licensed Spectrum and an Unlicensed Spectrum," U.S. patent application Ser. No. 15/269,874, filed on Sep. 19, 2016, an application entitled "Method and Apparatus for Operating a Device on a Licensed Spectrum and an Unlicensed Spectrum," U.S. patent application Ser. No. 15/341,900, filed on Nov. 2, 2016, and an application entitled "Method and Apparatus for Operating a Device on a Licensed Spectrum and an Unlicensed Spectrum," U.S. patent application Ser. No. 15/341,914, filed on Nov. 2, 2016, all commonly assigned to the assignee of the present application, which are hereby incorporated by reference.

BACKGROUND

1. Field

The present disclosure is directed to a method and apparatus for operating a device on a licensed spectrum and an unlicensed spectrum. More particularly, the present disclosure is directed to operating a device on a licensed spectrum and an unlicensed spectrum using the same radio access technology.

2. Introduction

Presently, people use wireless communication devices to make calls, read electronic mail, surf the Internet, stream movies, download files, connect to other devices, and perform other wireless communication actions. Wireless communication devices include smartphones, cellular phones, laptop computers, tablet computers, connected home devices, televisions, set top boxes, and other wireless communication devices. Many of these devices can send and receive data on multiple radio access technologies, such as cellular, Long Term Evolution (LTE), IEEE 802.11 (Wi-Fi), IEEE 802.15.1 (Bluetooth), and other radio access technologies. LTE and other carrier grade services operate on licensed frequency bands. IEEE 802.11 services, such as for a Wireless Local Area Network (WLAN), operate on both 2.4 GHz and 5 GHz unlicensed frequency bands.

LTE Advanced is a radio access technology that has been proposed for providing carrier-grade wireless service in the 5 GHz, unlicensed band. Until today, Wi-Fi has been the most popular choice for radio access in the unlicensed space. However, wireless wide area network, such as LTE, technology, originally envisioned for cellular operation only in licensed bands, has significant performance gains over Wi-Fi when operating in the unlicensed band. Some advantages of LTE Advanced include better and more reliable links, better performance, better efficiency in Medium Access Control (MAC), better wireless communication device management, and excellent coverage. Unfortunately, because LTE Advanced operates in the same 5 GHz unlicensed band as Wi-Fi, there are problems with conflicts between the two radio access technologies.

BRIEF DESCRIPTION OF THE DRAWINGS

In order to describe the manner in which advantages and features of the disclosure can be obtained, a description of the disclosure is rendered by reference to specific embodiments that are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for operating a device on a licensed spectrum and an unlicensed spectrum. According to a possible embodiment, the device can operate on a Wireless Wide Area Network (WWAN) band via a WWAN base station using a WWAN Radio Access Technology (RAT). The device can connect to a Wireless Local Area Network (WLAN) base station using the WWAN RAT on a WWAN RAT WLAN band operating on a WLAN frequency. The device can connect to a WLAN access point using a WLAN RAT on a WLAN RAT band operating on a WLAN frequency. The WWAN RAT WLAN band can be determined to be the same band as the WLAN RAT band. A signal metric of the WWAN RAT WLAN band or the WLAN RAT band can be compared to a threshold. Whether to disable communications on the WWAN RAT WLAN band or the WLAN RAT band can be determined based on comparing the signal metric of the WWAN RAT WLAN band or the WLAN RAT band to a threshold. Communications of the WWAN RAT WLAN band or the WLAN RAT band can be disabled if the communications on the WWAN RAT WLAN band or the WLAN RAT band should be disabled.

Figure 1:
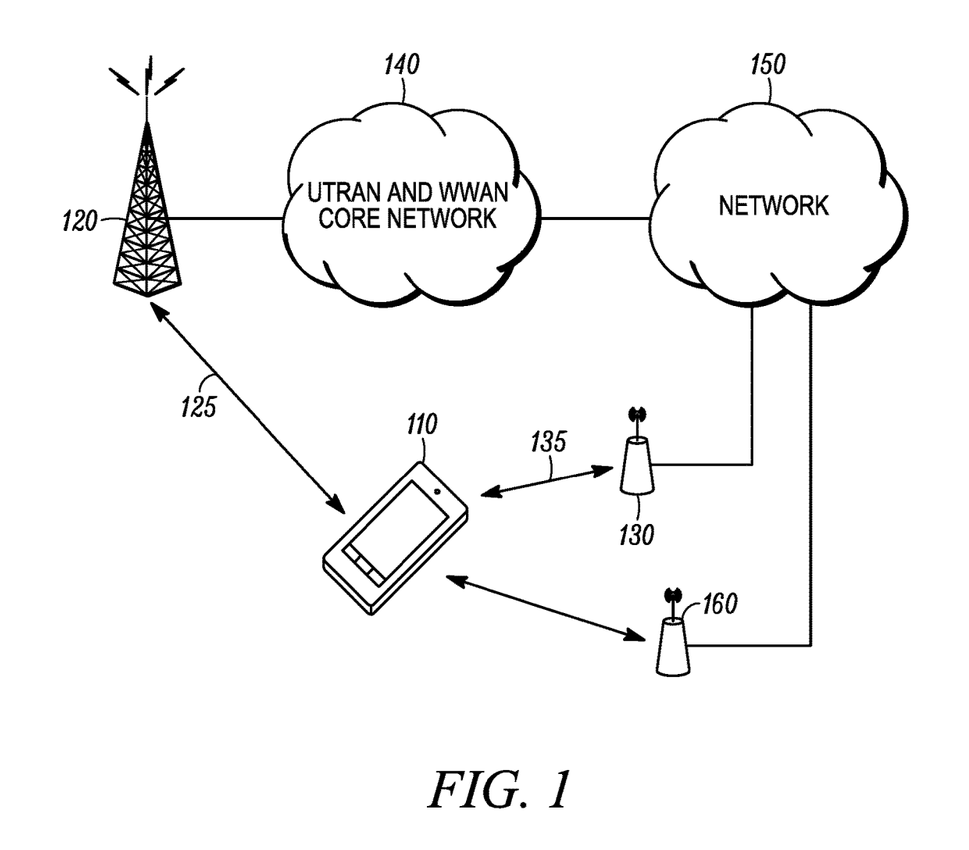
FIG. 1 is an example block diagram of a system according to a possible embodiment.

FIG. 1 is an example block diagram of a system 100 according to a possible embodiment. The system 100 can include a wireless communication device 110, a WWAN base station 120 that uses a WWAN RAT, a WLAN base station 130 that also uses the WWAN RAT, a Universal Terrestrial Radio Access Network (UTRAN) and WWAN core network 140, a WLAN access point 160 that uses a WLAN RAT, and a global network 150 that can include a plurality of networks. The wireless communication device 110 can be user equipment, a wireless terminal, a portable wireless communication device, a smartphone, a cellular telephone, a flip phone, a personal digital assistant, a device having a subscriber identity module, a personal computer, a selective call receiver, a tablet computer, a laptop computer, an Internet of Things (IoT) device, or any other device that is capable of sending and receiving communication signals on a wireless network.

The WWAN base station 120 can also be considered a WWAN RAT base station, a Long Term Evolution (LTE) base station, an enhanced NodeB (eNodeB or eNB), a base station that uses licensed cellular frequencies, or any other WWAN base station. The WLAN base station 130 that also uses the WWAN radio access technology can also be considered a WWAN RAT WLAN base station, a wireless wide area communication network advanced access point, an LTE Advanced eNodeB, an LTE-U base station, or any other base station or access point that operates on unlicensed frequencies, such as the 5 GHz spectrum, using a WWAN RAT. For example, the WLAN base station 130 that uses the wireless wide area network radio access technology can be considered a WWAN RAT WLAN because it uses the same WWAN RAT as the WWAN RAT base station 120 while operating on WLAN frequencies.

In operation, the device 110 can communicate with both the WWAN base station 120 and the WWAN RAT WLAN base station 130 using the same WWAN RAT. For example, the device 110 can operate using an LTE Advanced radio access technology by communicating with the WWAN base station 120 using a licensed band/frequency such as LTE band 4, and can communicate with the WLAN base station 130 using a 5 GHz unlicensed band/frequency, such as LTE band 255, for LTE Advanced communication. When communicating with both base stations 120 and 130, the device 110 can receive carrier aggregated data from both base stations 120 and 130 or can individually receive data from one of or each base station 120 and 130. When communicating with the WWAN RAT WLAN base station 130 using LTE band 255, the device 110 may not be connected to an 802.11 WLAN access point 160 to avoid signal interference because both radio access technologies can operate in the 5 GHz unlicensed band. However, the device 110 can also attempt to communicate with WLAN access point 160 operating on the 5 GHz WLAN unlicensed band/frequencies while communicating with the WWAN RAT WLAN base station 130 using LTE band 255.

Figure 2:
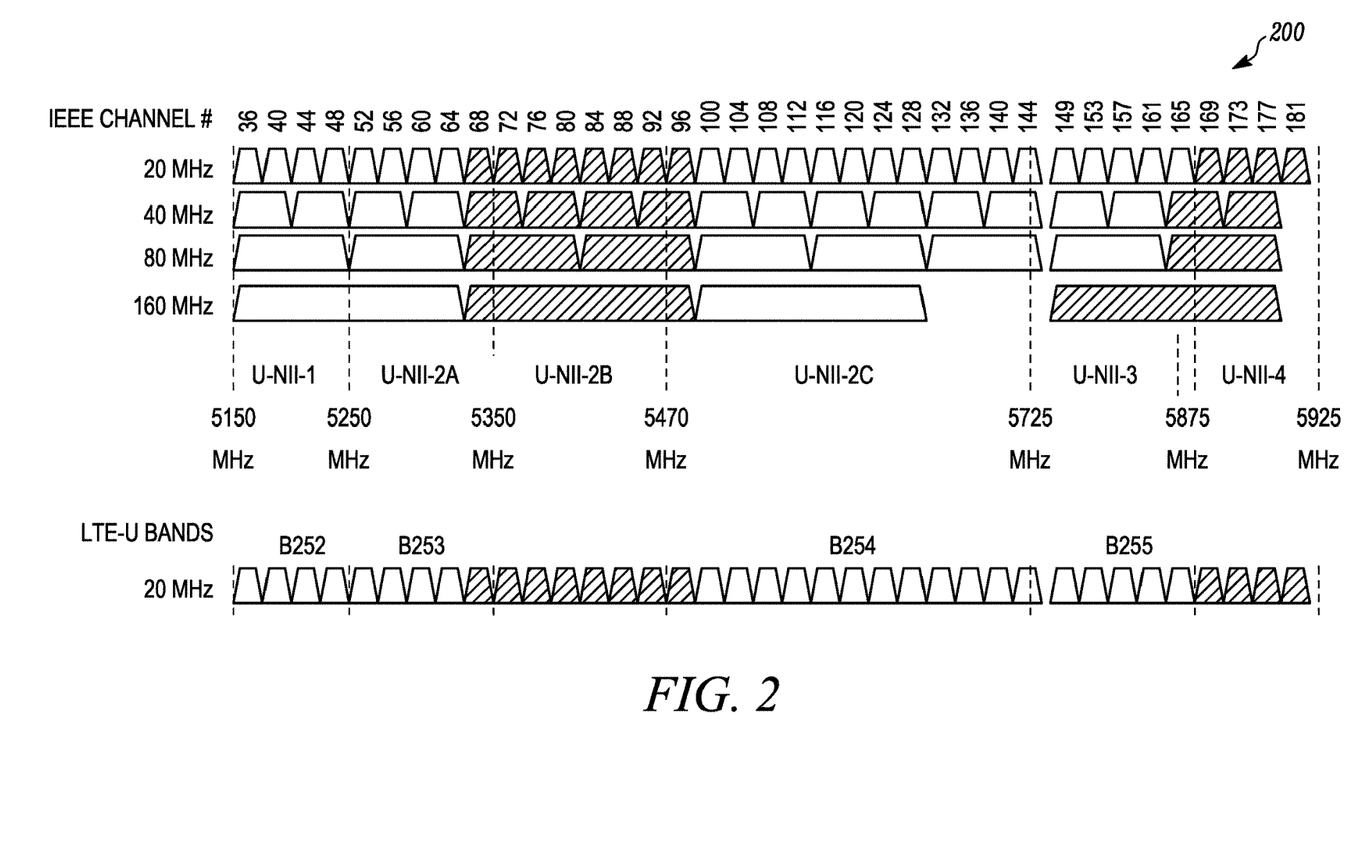
FIG. 2 is an example illustration of Unlicensed National Information Infrastructure bands according to a possible embodiment.

LTE Advanced radio access technologies can include License Assisted Access (LAA), LTE-Wi-Fi Aggregation (LWA), and MulteFire, LTE in Unlicensed spectrum (LTE-U), and other wireless wide area network advanced radio access technologies that provide for communication on both a wireless wide area network and a wireless local area network. These radio access technologies may require that the device 110 operates on a corresponding WLAN base station 130 using a clean channel According to a possible embodiment, an uplink channel, such as a paging channel, and a signaling channel can be on an LTE licensed channel, while received data can be on one or on both of a licensed channel and an unlicensed 5 GHz spectrum channel FIG. 2 is an example illustration of Unlicensed National Information Infrastructure (U-NII) bands U-NII-1 through U-NII-4 in the unlicensed 5 GHz spectrum 200 ranging from 5,150 MHz through 5,925 MHz according to a possible embodiment. Various IEEE 802.11 channels ranging from 36-181 can operate in the 5 GHz spectrum. These channels can be combined to have bandwidths of 20 MHz, 40 MHz, 80 MHz, and 160 MHz. LTE Advanced can also operate in the 5 GHz spectrum. For example, LTE-U bands B252, B253, B254, and B255 can operate in the 5 GHz spectrum and additional bands can be added. Initial deployments of LTE-U can support bands B252 and B255, while bands B253 and B254 can be in the Dynamic Frequency Selection (DFS) spectrum. Within each LTE-U band, there can be multiple 20 MHz wide channels that can be used.

Referring back to FIG. 1, a downlink in a communication signal 135 from the WWAN RAT WLAN base station 130 operating in the 5 GHz spectrum in the system 100 can supplement a downlink in a communication signal 125 from the WWAN base station 120 for carrier aggregation using different scenarios. Carrier Aggregation (CA) can be done to boost wireless wide area network data throughput under different wireless wide area network band combinations for supplemental downlink reception.

TABLE 1

LTE-U supplemental downlink carrier aggregation scenarios

| # | Band Combination | Licensed Band | Unlicensed Band | BW (MHz) | CA Configuration |
|---|---|---|---|---|---|
| 1 | B13 + B252 + B252 | B13 | U-NII-1 | 10 + 20 + 20 | inter-band + unlicensed intra-band contiguous DL CA w/o UL CA |
|   | B13 + B255 + B255 | B13 | U-NII-3 | 10 + 20 + 20 | |
| 2 | B13 + B252 | B13 | U-NII-1 | 10 + 20 | inter-band DL CA without UL CA |
|   | B13 + B255 | B13 | U-NII-3 | 10 + 20 | |
| 3 | B2 + B252 + B252 | B2 | U-NII-1 | [5, 10, 15, 20] + 20 + 20 | inter-band + unlicensed intra-band contiguous DL CA w/o UL CA |
|   | B2 + B255 + B255 | B2 | U-NII-3 | [5, 10, 15, 20] + 20 + 20 | |
| 4 | B2 + B252 | B2 | U-NII-1 | [5, 10, 15, 20] + 20 | inter-band DL CA without UL CA |
|   | B2 + B255 | B2 | U-NII-3 | [5, 10, 15, 20] + 20 | |
| 5 | B4 + B252 + B252 | B4 | U-NII-1 | [5, 10, 15, 20] + 20 + 20 | inter-band + unlicensed intra-band contiguous DL CA w/o UL CA |
|   | B4 + B255 + B255 | B4 | U-NII-3 | [5, 10, 15, 20] + 20 + 20 | |
| 6 | B4 + B252 | B4 | U-NII-1 | [5, 10, 15, 20] + 20 | inter-band DL CA without UL CA |
|   | B4 + B255 | B4 | U-NII-3 | [5, 10, 15, 20] + 20 | |

As shown in Table 1, the LTE and LTE-U Operating bands for carrier aggregation can be with LTE bands B2/B4/B13 and LTE-U bands B252/B255. The other LTE bands may or may not be used for carrier aggregation. The LTE and LTE-U aggregation can be for 20 MHz wide channels, where initial deployments can be for scenarios 2, 4, and 6 in Table 1.

For LTE Advanced, such as LTE-U, deployment methodology, factors including deployment layout, channel model, available spectrum, and other factors can be considered for coexistence performance between 802.11 and LTE-U systems, as well as between different LTE-U nodes, such as LTE-U base stations. For example, when LTE is simply deployed in unlicensed spectrum without any coexistence mechanism, LTE can cause performance degradation on coexisting neighbor 802.11 systems. Managing the coexistence of Wi-Fi and LTE-U can mitigate performance degradation for deployment of the LTE-U supported access points, such as wireless local area network base stations that use wireless wide area network radio access technology, in a wireless medium environment with 802.11. Methods to solve 802.11 and LTE-U coexistence can include Carrier Sense Adaptive Transmission (CSAT), channel selection, Opportunistic Supplemental Downlink (OSDL), and Listen Before Talk (LBT).

Figure 3:
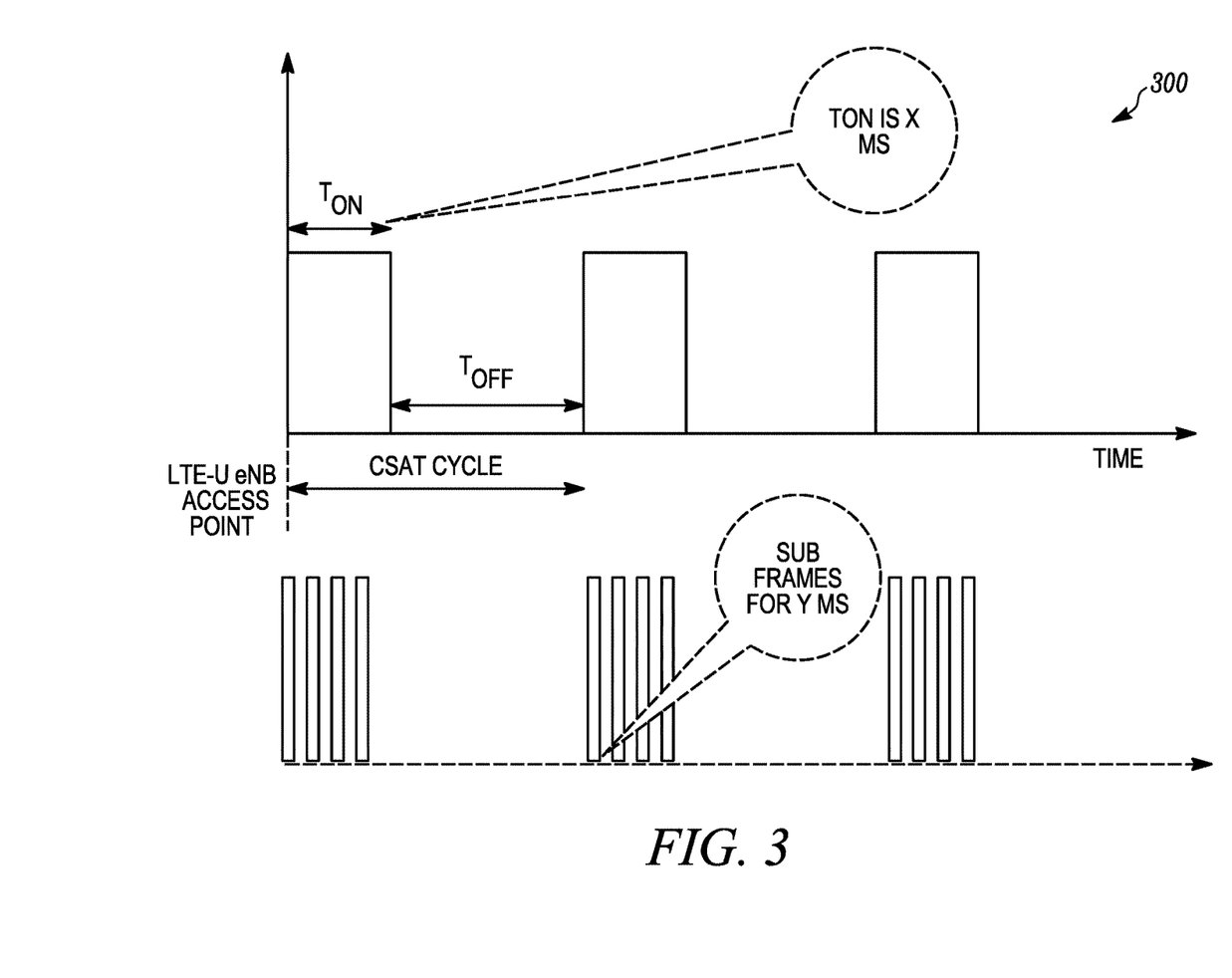
FIG. 3 is an example illustration of carrier sense adaptive transmission according to a possible embodiment.

FIG. 3 is an example illustration 300 of CSAT according to a possible embodiment. With CSAT, communication in unlicensed spectrum can be used to avoid and mitigate the interference between radio access technologies to use unlicensed 5 GHz spectrum for transmission, based on Time Division Multiplexing (TDM) communication patterns, which can be done periodically, where time slots up to 20-50 msec can be reserved for mobile operators, such as wireless wide area network operators. The CSAT cycle can be X ms apart, which can be repeated periodically. $T_{ON}$ can be the duration when a LTE base station can transmit the data to a wireless communication device for aggregation. $T_{OFF}$ can be the duration when the LTE base station may not transmit any data to device. For latency sensitive application such as Voice over Wi-Fi Calling (VoWFC) the $T_{ON}$ can be divided into sub frames for Y ms. X ms and Y ms can be configured by a mobile, such as LTE, operator and dynamically changed based on the interference and data load. The value of X and Y in the CSAT cycle can be dynamic and can be configured at run time by the operator, which may or may not bring down the whole throughput of the network.

For the channel selection solution for coexistence, the cleanest channel in general can be chosen where 802.11 primary channels can be avoided, channels occupied by other LTE-U operators can be avoided, and the channel occupied by the same LTE-U operator can be chosen. The channel selection can further be based on network operator decisions. For the OSDL solution for coexistence, data transmissions can be avoided if there is a small amount of traffic. For example, if the data activity for the LTE usage is below certain threshold, then the LTE-U CSAT cycle can be shut down and legacy behavior can be used.

CSAT polling can be of a fixed duration, while LBT can be dynamic. For example, in LBT, a radio transceiver can first sense, such as listen to, a channel before it starts a transmission. If a selected channel is busy, the radio transceiver can wait until the channel is free. If the channel is not busy, the radio transceiver can start the transmission.

Figure 4:
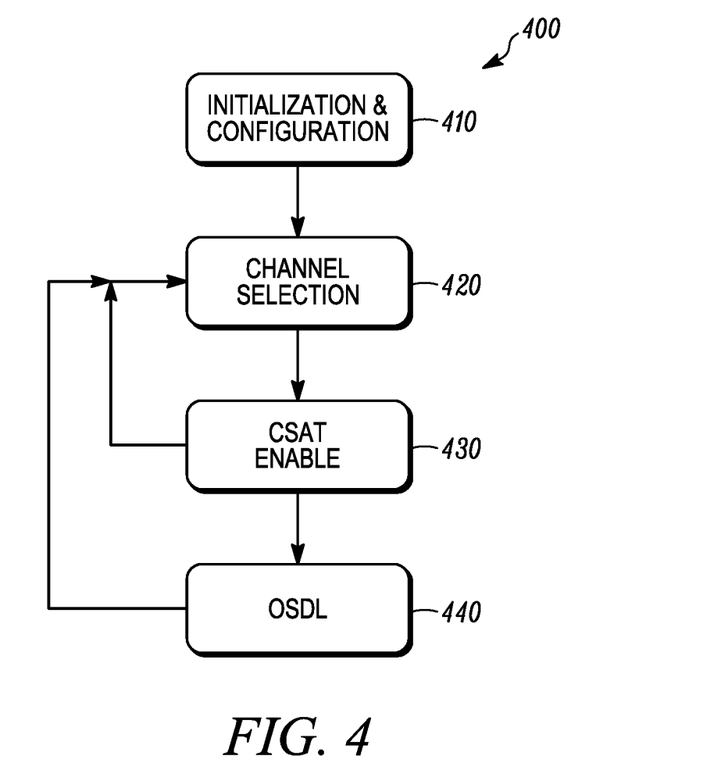
FIG. 4 is an example state diagram for LTE-U coexistence according to a possible embodiment.

FIG. 4 is an example state diagram 400 for LTE-U coexistence according to a possible embodiment. At 410, coexistence initiation and configuration can be administered by the mobile operator. At 420, channel selection can be performed. The channel selection algorithm can be specific to the vendor that provided the chip for the LTE-U access point/base station. At 430, then CSAT can be enabled and the CSAT duty cycle can be controlled based on the traffic and load on the network. At 440, OSDL can shut off the LTE-U completely when the system identifies the data quantity to be transmitted on LTE-U band is less.

According to a possible embodiment, 5 GHz Band selection for a base station can be used for WWAN and WLAN carrier aggregation, such as LTE-U, LAA, LWA and MulteFire, to provide a good user experience with faster data rates. To use carrier aggregation, devices can support data aggregation on LTE and Wi-Fi links simultaneously. LTE-U can perform data reception (Rx) on LTE-U bands 252/253/ 254/255 and a corresponding acknowledgement (ACK) for the data packets can be routed to the network on bands 2/4/13. However for LAA, LWA and MulteFire, the download (receive) and upload (transmission) of data and signals can be on the same band. For example, Rx and Tx can use the same LTE-U band.

A Packet Error Rate (PER) of 0% and a Signal-to-Noise Ratio (SNR) of 100% can provide good data throughput. However, in a practical environment these values are not typically achieved due to multiple technologies, such as Wi-Fi, Peer-to-Peer (P2P), Mobile Hot Spot (MHS), and Near-me Area Network (NAN), that can work in the same frequency medium, which can be governed by Carrier-Sense Multiple Access with Collision Avoidance (CSMA/CA) protocol. Thus, the higher the interference levels, the more likely the device, such as a user equipment, may fail to decode the packets correctly, such as when there are Cyclic Redundancy Check (CRC) errors, and the device may then send a NACK to the network that in turn would have to retransmit the data. Too many retransmissions due to high levels of interference can waste radio resources. These environments can become more prone to interference level in public places, such as malls, airports, shopping complexes, public stadiums, and other places with wireless signal congestion. This can degrade the performance of the data throughput.

LTE-U is designed to do carrier aggregation on LTE-U band 2/4/13 and LTE-U band 252/253/254/255. Thus, it is possible that due to a large interference in 5 GHz, the data rate on LTE-U for 5 GHz band can be low, which can bring down the whole data rate of LTE-U band 2/4/13. Embodiments can check and disable the LTE-U Advance on the devices dynamically, when PER on a WLAN link exceeds certain threshold along with LTE-U link.

According to a possible embodiment, the operating band for base station can be set by the carrier. The base station can use the best or cleanest band set by carrier, but it still can be prone to heavy interference with other surrounding Wi-Fi access points that are on the same or different bands and data traffic is active for other devices that are connected to the Wi-Fi Access Points. Devices can support the LTE and Wi-Fi aggregation for download and upload on both links. When the Wi-Fi and LTE-U band is same, the PER on WLAN interface can be computed, and the LTE-U radio can be disabled when the PER threshold is exceeded while maintaining the hysteresis. If the band is of the same band, then two levels of checks can be performed. First, the PER on WLAN can be checked and along with its threshold, and then the PER for the WWAN WLAN interface can be checked along with its threshold. If the checks do not meet the checking condition, then the LTE-U radio/band can be disabled. If the device changes its location, the LTE-U can be enabled again.

Figure 5:
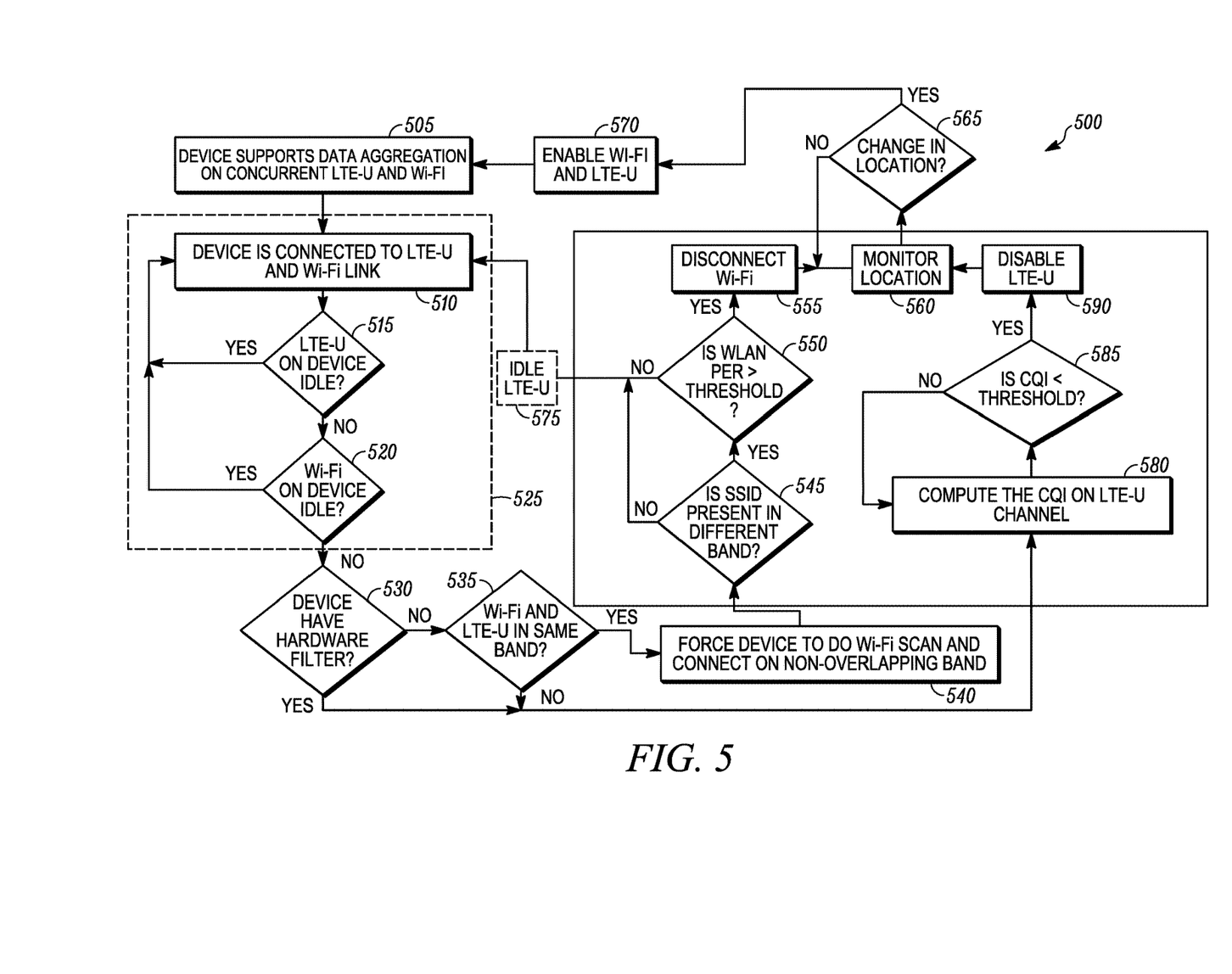
FIG. 5 is an example flowchart illustrating the operation of a device according to a possible embodiment.

FIG. 5 is an example flowchart diagram 500 illustrating the operation of a device, such as the device 110, according to a possible embodiment. The diagram 500 can also be considered a state diagram showing various states of operation. The diagram 500 describes operation using LTE-U and Wi-Fi as an example, but it can be equally applicable to other WWAN RAT WLAN and WLAN RAT technologies. At 505, the device can support data aggregation on concurrent LTE-U and Wi-Fi.

At 510, the device can be connected to LTE-U and WLAN, such as Wi-Fi, links. According to a possible embodiment for connecting to LTE-U and/or WLAN, WLAN frequencies can be scanned. The scanned WLAN frequencies can be frequencies for IEEE.802.11 bands 36-181 corresponding to LTE-U U-NII-1 through U-NII-4, as well as other similar frequencies. Scanning can include scanning for a beacon and/or probing for a response. A base station can typically transmit the beacon every 100 ms. When probing for a response, the device can send one probe request on a given band and multiple base stations that are operating on that band can then send a probe response. A beacon and/or a probe response can include WLAN information such as a Service Set Identifier (SSID) of a WLAN and/or corresponding base station, a Basic Service Set Identifier (BSSID), such as a Medium Access Control (MAC) address of an 802.11 chipset running on the base station, a band of the base station, capabilities of the base station, and other information. At least some of this information can be sent as the results of scanning the WLAN frequencies. Information about the at least one WLAN base station can be determined based on scanning the WLAN frequencies and thus can be part of the results of scanning the WLAN frequencies.

At 515, a determination can be made as to whether LTE-U on the device is idle, if so, the device can continue in state 510. At 520, a determination can be made as to whether Wi-Fi on the device is idle. If so, the device can continue in state 510. The state 525 including states 510, 515, and 520 can be continuous operations that can be performed throughout the diagram 500. Other states and blocks in the diagram 500 can also operate continuously while other states and blocks operate.

If both LTE-U and Wi-Fi are not idle on the device, at 530 a determination can be made as to whether the device has a hardware filter. An example of a hardware filter used in some embodiments can be a thin-Film Bulk Acoustic Resonator (FBAR) filter. FBAR filters can be used in devices, such as cell phones, to remove unwanted frequencies from being transmitted or received in certain frequency bands in the devices. A FBAR can be a device including a piezoelectric material sandwiched between two electrodes and acoustically isolated from the surrounding medium. FBAR devices using piezoelectric films with thicknesses ranging from several micrometers down to tenth of micrometers can resonate in the frequency range of roughly 100 MHz to 10 GHz. Aluminum nitride and zinc oxide can be two common piezoelectric materials used in FBARs.

If the device does not have a hardware filter, at 535 a determination can be made as to whether Wi-Fi and LTE-U are in the same frequency band. If they are in the same frequency band, at 540, the device can be forced to do a Wi-Fi scan and connect on a non-overlapping band.

At 545, a determination can be made as to whether a SSID is present in a different band. If so, at 550 a determination can be made as to whether the WLAN Packet Error Rate (PER) is larger than a threshold. If so, at 555, Wi-Fi can be disconnected. At 560, the location of the device can be monitored. At 565, if there is a change in location, at 570 Wi-Fi and LTE-U can be enabled. If the SSID is not present in a different band at 545 and if the WLAN PER is less than a threshold at 550, then at 575 the LTE-U can optionally be placed into idle state and the process can return to 510.

If the device has a hardware filter at 530 or Wi-Fi and LTE-U are not in the same band at 535, at 580, a Channel Quality Indicator (CQI) can be computed for the LTE-U channel. At 585, a determination can be made as to whether the CQI is less than a threshold. If so, at 590, LTE-U can be disabled and the process can continue at 560.

Figure 6:
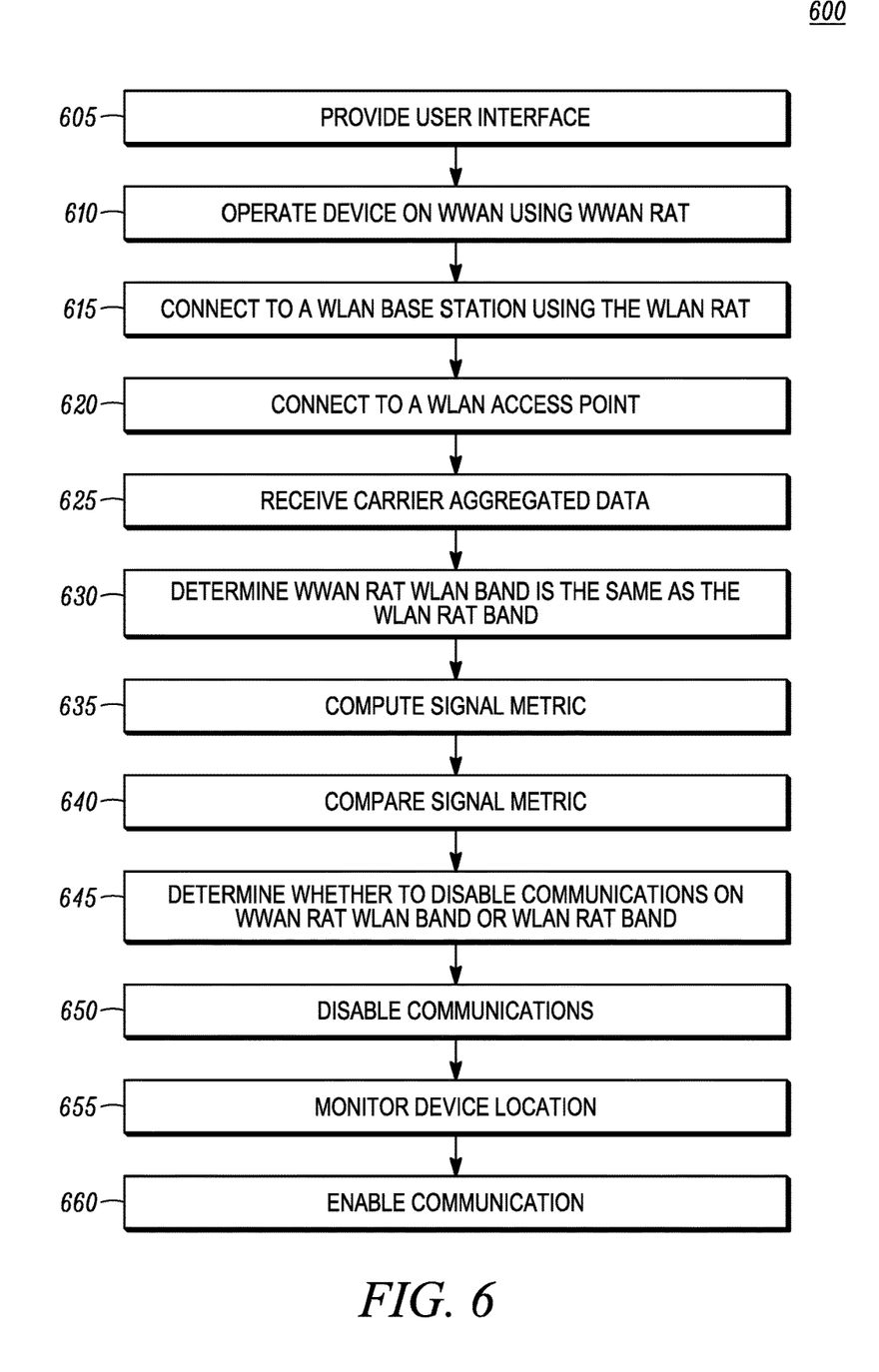
FIG. 6 is an example flowchart illustrating the operation of device according to a possible embodiment.

FIG. 6 is an example flowchart 600 illustrating the operation of a wireless communication device, such as the device 110, according to a possible embodiment. At 605, a user interface can be provided to enable and disable a WWAN RAT WLAN band. The user interface can be a virtual button, a virtual switch, a physical switch, an icon, or any other interface that can be used to enable and disable the WWAN RAT WLAN band.

At 610, the device can operate on a WWAN band via a WWAN base station using a WWAN RAT. A WWAN base station can be a cellular base station, an LTE base station, a licensed frequency base station, an eNodeB, and/or any other WWAN base station using a corresponding wireless technology band. According to a possible embodiment, the WWAN can be an LTE-based network.

At 615, the device can connect to a WLAN base station using the WWAN RAT on a WWAN RAT WLAN band operating on a WLAN frequency. The WLAN base station using the WWAN RAT can be a local base station, a base station operating in a 5 GHz spectrum, a base station operating on an unlicensed frequency spectrum, a wireless access point, and/or any other WLAN base station using a corresponding wireless technology band. The WWAN RAT can be a LTE-based RAT, can be a IEEE 802.16m RAT, or other WWAN RATs, such as RATs common to a given cellular and/or WWAN service provider. The WWAN RAT can use LTE-U, LAA, LWA, and MulteFire, LTE-U, and other wireless wide area network advanced radio access technologies for carrier aggregation on WWAN and WLAN bands. Other RATs can include 802.11 RATs, 802.15 RATs, and other RATs. The WLAN frequency that the WWAN RAT WLAN band operates on can include a plurality of WLAN frequencies that overlap with WLAN frequencies of the 802.11 RAT. The band of the WLAN frequencies can be a band in frequencies for IEEE.802.11 bands 36-181 corresponding to LTE-U U-NII-1 through U-NII-4, such as unlicensed WLAN frequencies, as well as other similar frequencies. For example, the WLAN frequencies can be frequencies in a range of 4,915 MHz to 5,925 MHz. The WLAN base station using the WWAN RAT and the WWAN base station using the WWAN RAT can be base stations of a same service provider. Also, an indication of the WWAN RAT WLAN band to be used can be received from a network operator, such as a service provider. The indication can be received via a WLAN, a WWAN, or any other band on any other network system.

At 620, the device can connect to a WLAN access point using a WLAN RAT on a WLAN RAT band operating on a WLAN frequency. According to a possible embodiment, the WLAN can be an 802.11 frequency-based network. For example, the WLAN access point using the WLAN RAT can use an 802.11-based RAT, such as Wi-Fi, or other local area network-based RAT. The WLAN frequency can be in a band of the WLAN frequencies for IEEE.802.11 bands 36-181 corresponding to LTE-U U-NII-1 through U-NII-4, such as unlicensed WLAN frequencies, as well as other similar frequencies. For example, the WLAN frequencies can be frequencies in a range of 4,915 MHz to 5,925 MHz.

At 625, carrier aggregated data can be received on a combination of the WWAN band and the WWAN RAT WLAN band. Data can also just be received on one or the other of the WLAN and WWAN bands/base stations. Data can also be aggregated from signals received on the WWAN band and the WLAN RAT band or any other combination of the bands. According to a possible embodiment, data received on WWAN and WLAN bands can be aggregated when both of the WWAN and WLAN interfaces are active and downloading data, such as data coming in chunks on both of the interfaces and is then re-assembled at a lower layer. This can allow a device to have higher throughput. Since LTE-U advanced on WLAN bands is also an option, it may disturb the WLAN throughput especially when there is a simultaneous download on both WWAN and WLAN radios.

At 630, the WWAN RAT WLAN band can be determined to be the same band as the WLAN RAT band. At 635, a signal metric can be computed. According to a possible embodiment, the signal metric can be a data error rate and the data error rate can be computed on the WLAN RAT band. The data error rate can be a packet error rate, a block error rate, a bit error rate, or any other data error rate. According to another possible embodiment, the signal metric can be a band quality indicator, such as a CQI, and the band quality indicator of the WWAN RAT WLAN band can be computed.

At 640, the signal metric of the WWAN RAT WLAN band or the WLAN RAT band can be compared to a threshold. At 645, whether to disable communications on the WWAN RAT WLAN band or the WLAN RAT band can be determined based on comparing the signal metric of the WWAN RAT WLAN band or the WLAN RAT band to a threshold. When the signal metric is a data error rate, determining can include determining communications on the WLAN RAT band should be disabled if the data error rate on the WLAN RAT band exceeds the threshold. When the signal metric is a band quality indicator, determining can include determining communications on the WWAN RAT WLAN band should be disabled if the band quality indicator of the WWAN RAT WLAN band is below the threshold.

At 650, communications of the WWAN RAT WLAN band or the WLAN RAT band can be disabled if the communications on the WWAN RAT WLAN band or the WLAN RAT band should be disabled. A band can include multiple channels. The WWAN RAT WLAN band or the WLAN RAT band that has the communications disabled may or may not be the one that has had its signal metric compared to the threshold. Disabling can include disabling communications on one of the WWAN RAT WLAN band or the WLAN RAT band and maintaining communications on the other of the WWAN RAT WLAN band or the WLAN RAT band if the communications on the WWAN RAT WLAN band or the WLAN RAT band should be disabled.

For example, either WLAN, such as Wi-Fi, or LTE-U aggregation can be disabled when a signal metric of one or the other does not compare favorably to a threshold. According to a possible example, if WLAN Packet Error Rate (PER)>threshold, then the WLAN radio on a device can be disabled, and if LTE-U also becomes bad, as evidenced by a LTE-U Band Quality Indicator (CQI)>threshold, then LTE-U can also be disabled. According to another possible example, LTE-U can be disabled first if its CQI>threshold and then WLAN can later be disabled if its PER>threshold. Information indicating communication was disabled on the WWAN RAT WLAN band can be sent to a WWAN RAT service provider. For example, this can help the service provider, such as a carrier, get this information from various devices. The service provider can then check which periods of time the WWAN RAT WLAN base stations are not helping devices in certain regions. The service provider can then deactivate WWAN RAT WLAN operation in certain regions for a certain period when the WWAN RAT WLAN base stations are not helping.

At 655, the location of the device can be monitored. At 660, communication of the disabled WWAN RAT WLAN band and/or the WLAN RAT band can be enabled if the location of the device has changed. The determination of whether the location has changed can be a combination of positioning information along with scan results, such as by knowing that there are different WLAN access points present in different locations. A given distance that indicates a location change can be based on a distance from a given access point. For example, a geofence can be created based on the effective range of an access point and the location of change can be based on a distance at or past the geofence. The change of location can also be based on the device moving a significant distance that would change the determination of the load on the band. Examples of systems that provide positioning information can include Global Positioning System (GPS), Global Navigation Satellite System (GNSS), cellular triangulation, deduced reckoning, Wi-Fi location, Bluetooth beacons, and/or other systems that provide positioning information.

According to a possible implementation, a WLAN access point load on the WWAN RAT WLAN band can be calculated based on scanning the WLAN frequencies. Communication using the WWAN RAT WLAN band can be disabled and communicating on the WWAN band can be allowed when a packet error rate exceeds a threshold and the WLAN access point load exceeds a threshold.

Figure 7:
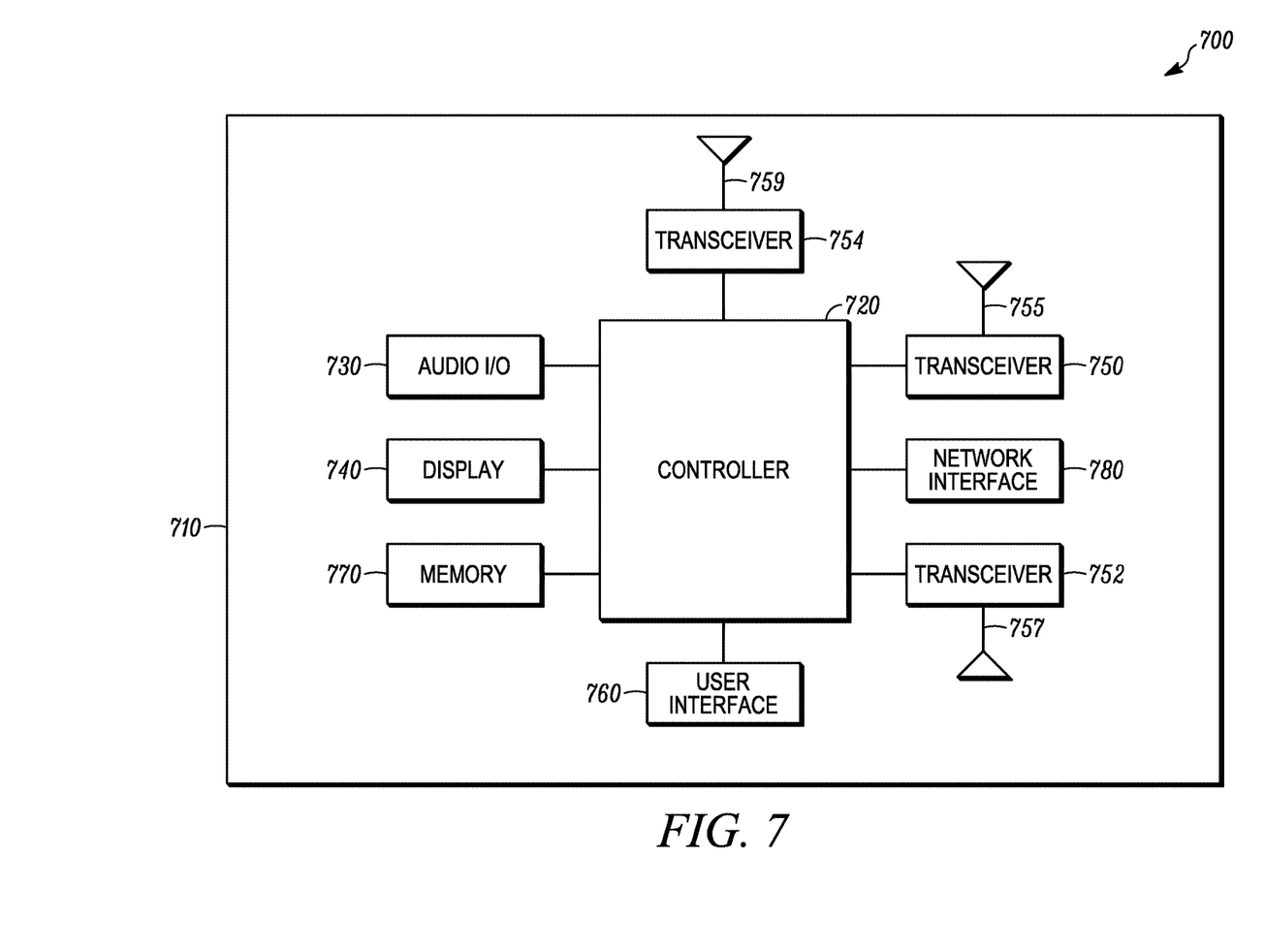
FIG. 7 is an example block diagram of an apparatus according to a possible embodiment.

FIG. 7 is an example block diagram of a device 700, such as the wireless communication device 110, according to a possible embodiment. The device 700 can include a housing 710, a controller 720 within the housing 710, audio input and output circuitry 730 coupled to the controller 720, a display 740 coupled to the controller 720, a first transceiver 750 coupled to the controller 720, an antenna 755 coupled to the first transceiver 750, a second transceiver 752 coupled to the controller 720, a second antenna 757 coupled to the second transceiver 752, a third transceiver 754 coupled to the controller 720, a third antenna 759 coupled to the third transceiver 754, a user interface 760 coupled to the controller 720, a memory 770 coupled to the controller 720, and a network interface 780 coupled to the controller 720. The device 700 can perform the methods described in all the embodiments.

The display 740 can be a viewfinder, a liquid crystal display (LCD), a light emitting diode (LED) display, a plasma display, a projection display, a touch screen, or any other device that displays information. The first, second, and third transceivers 750, 752, and 754 can each include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The user interface 760 can be and/or can display a user interface that enables and disables the WWAN RAT WLAN band. The network interface 780 can be a Universal Serial Bus (USB) port, an Ethernet port, an infrared transmitter/receiver, an IEEE 1394 port, a WLAN transceiver, or any other interface that can connect a device to a network, device, or computer and that can transmit and receive data communication signals. The memory 770 can include a random access memory, a read only memory, an optical memory, a flash memory, a removable memory, a hard drive, a cache, or any other memory that can be coupled to a device.

The device 700 and/or the controller 720 may implement any operating system, such as Microsoft Windows®, UNIX®, or LINUX®, Android™, or any other operating system. Device operation software may be written in any programming language, such as C, C++, Java or Visual Basic, for example. Device software may also run on an application framework, such as, for example, a Java® framework, a .NET® framework, or any other application framework. The software and/or the operating system may be stored in the memory 770 or elsewhere on the device 700. The device 700 or the controller 720 may also use hardware to implement disclosed operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating a device and implementing the disclosed embodiments.

In operation, the first transceiver 750 can be a WWAN transceiver that can operate the device 700 on a WWAN channel via a WWAN RAT base station using a WWAN RAT. The second transceiver 752 can be at least a WWAN RAT WLAN receiver that can connect to a WWAN RAT WLAN base station using the WWAN RAT on a WWAN RAT WLAN channel operating on a WLAN frequency. The controller 720 can receive carrier aggregated data on a combination of the WWAN band and the WWAN RAT WLAN band. The third transceiver 754 can be a WLAN transceiver that can connect to a WLAN access point using a WLAN RAT on a WLAN RAT band operating on a WLAN frequency.

The controller 720 can determine the WWAN RAT WLAN band is the same band as the WLAN RAT band. The controller 720 can compare a signal metric of one selected from the WWAN RAT WLAN band and the WLAN RAT band to a threshold. The controller 720 can determine whether to disable communications on one selected from the WWAN RAT WLAN band and the WLAN RAT band based on comparing the signal metric of the one selected from the WWAN RAT WLAN band and the WLAN RAT band to a threshold.

The controller 720 can disable communications of one selected from the WWAN RAT WLAN band and the WLAN RAT band if the communications on the one selected from the WWAN RAT WLAN band and the WLAN RAT band should be disabled. The controller 720 can disable communications on the one selected from the WWAN RAT WLAN band and the WLAN RAT band and maintain communications on the other of the WWAN RAT WLAN band and the WLAN RAT band if the communications on the one selected from the WWAN RAT WLAN band and the WLAN RAT band should be disabled. According to a possible embodiment, the signal metric can be a data error rate and the controller 720 can compute the data error rate on the WLAN RAT band and determine communications on the WLAN RAT band should be disabled if the data error rate on the WLAN RAT band exceeds the threshold. According to another possible embodiment, the signal metric can be a band quality indicator and the controller 720 can compute the band quality indicator of the WWAN RAT WLAN band and determine communications on the WWAN RAT WLAN band should be disabled if the band quality indicator of the WWAN RAT WLAN band is below the threshold. The controller 720 can monitor a location of the device and enable communication of the WWAN RAT WLAN band and/or the WLAN RAT band that has had its communications disabled if the location of the device has changed.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   operating a device on a wireless wide area network band via a wireless wide area network base station using a wireless wide area network radio access technology;
   connecting, by the device, to a wireless local area network base station using the wireless wide area network radio access technology on a wireless wide area network radio access technology wireless local area network band operating on a wireless local area network frequency;
   connecting, by the device, to a wireless local area network access point using a wireless local area network radio access technology on a wireless local area network radio access technology band operating on a wireless local area network frequency;

determining the wireless wide area network radio access technology wireless local area network band is the same band as the wireless local area network radio access technology band;

comparing a signal metric of one selected from the wireless wide area network radio access technology wireless local area network band and the wireless local area network radio access technology band to a threshold;

determining whether to disable communications on one selected from the wireless wide area network radio access technology wireless local area network band and the wireless local area network radio access technology band based on comparing the signal metric of the one selected from the wireless wide area network radio access technology wireless local area network band and the wireless local area network radio access technology band to a threshold;

disabling communications of one selected from the wireless wide area network radio access technology wireless local area network band and the wireless local area network radio access technology band if the communications on the one selected from the wireless wide area network radio access technology wireless local area network band and the wireless local area network radio access technology band should be disabled;

monitoring a location of the device; and enabling communication of the one selected from the wireless wide area network radio access technology wireless local area network band and the wireless local area network radio access technology band that has had its communications disabled if the location of the device has changed, wherein the signal metric comprises a wireless local area network radio access technology communication data error rate, wherein the method further comprises computing the wireless local area network radio access technology communication data error rate on the wireless local area network radio access technology band, wherein comparing the signal metric of one selected from the wireless wide area network radio access technology wireless local area network band and the wireless local area network radio access technology band to the threshold comprises comparing the wireless local area network radio access technology communication data error rate on the wireless local area network radio access technology band to the threshold, wherein determining comprises determining communications on the wireless local area network radio access technology band should be disabled if the wireless local area network radio access technology communication data error rate on the wireless local area network radio access technology band exceeds the threshold, and wherein disabling communications comprises disabling wireless local area network radio access technology communications on the wireless local area network radio access technology band if the wireless local area network radio access technology communication data error rate on the wireless local area network radio access technology band exceeds the threshold.

2. The method according to claim 1, wherein the signal metric comprises a band quality indicator, wherein the method further comprises computing the band quality indicator of wireless wide area network radio access technology communications on the wireless wide area network radio access technology wireless local area network band, and wherein determining comprises determining the communications on the wireless wide area network radio access technology wireless local area network band should be disabled if the band quality indicator of wireless wide area network radio access technology communications on the wireless wide area network radio access technology wireless local area network band is below the threshold, and wherein disabling communications comprises disabling communications of the wireless wide area network radio access technology wireless local area network band if the band quality indicator of wireless wide area network radio access technology communications on the wireless wide area network radio access technology wireless local area network band is below the threshold.

3. The method according to claim 1, wherein disabling comprises disabling communications on the one selected from the wireless wide area network radio access technology wireless local area network band and the wireless local area network radio access technology band and maintaining communications on the other of the wireless wide area network radio access technology wireless local area network band and the wireless local area network radio access technology band if the communications on the one selected from the wireless wide area network radio access technology wireless local area network band and the wireless local area network radio access technology band should be disabled.

4. The method according to claim 1, further comprising providing a user interface to enable and disable the wireless wide area network radio access technology wireless local area network band.

5. The method according to claim 1, further comprising receiving carrier aggregated data on a combination of the wireless wide area network band and the wireless wide area network radio access technology wireless local area network band.

6. The method according to claim 1, wherein the wireless wide area network comprises a long term evolution-based network and the wireless local area network comprises an 802.11 frequency-based network.

7. The method according to claim 1, wherein the wireless local area network frequencies comprise frequencies in a range of 4,915 MHz to 5,925 MHz.

8. The method according to claim 1, wherein the wireless local area network base station using the wireless wide area network radio access technology and the wireless wide area network base station using the wireless wide area network radio access technology are base stations of a same service provider.

9. The method according to claim 1, wherein determining the wireless wide area network radio access technology wireless local area network band is the same band as the wireless local area network radio access technology band comprises determining the wireless wide area network radio access technology wireless local area network band is at least part of the same band as the wireless local area network radio access technology band.

10. The method according to claim 1, wherein comparing the signal metric comprises comparing a signal metric of wireless wide area network radio access technology communications on the wireless wide area network radio access technology wireless local area network band and a first threshold, wherein the method further comprises comparing a signal metric of wireless local area network radio access technology communications on the wireless local area network radio access technology band to second threshold, wherein determining comprises determining whether to disable communications on the wireless wide area network radio access technology wireless local area network band based on comparing the signal metric of wireless wide area network radio access technology communications on the wireless wide area network radio access technology wireless local area network band and the first threshold, wherein the method further comprises determining whether to disable communications on the wireless local area network radio access technology band based on comparing a signal metric of wireless local area network radio access technology communications on the wireless local area network radio access technology band to second threshold, wherein disabling communications comprises disabling communications of the wireless wide area network radio access technology wireless local area network band if the communications on the wireless wide area network radio access technology wireless local area network band should be disabled, and wherein the method further comprises disabling communications of the wireless local area network radio access technology band if the communications on the wireless local area network radio access technology band should be disabled.

11. An apparatus comprising:
a first transceiver that operates on a wireless wide area network band via a wireless wide area network base station using a wireless wide area network radio access technology;
a second transceiver that connects to a wireless local area network base station using the wireless wide area network radio access technology on a wireless wide area network radio access technology wireless local area network band operating on a wireless local area network frequency;
a third transceiver that connects to a wireless local area network access point using a wireless local area network radio access technology on a wireless local area network radio access technology band operating on a wireless local area network frequency; and
a controller that
determines the wireless wide area network radio access technology wireless local area network band is the same band as the wireless local area network radio access technology band,
compares a signal metric of one selected from the wireless wide area network radio access technology wireless local area network band and the wireless local area network radio access technology band to a threshold,
determines whether to disable communications on one selected from the wireless wide area network radio access technology wireless local area network band and the wireless local area network radio access technology band based on comparing the signal metric of the one selected from the wireless wide area network radio access technology wireless local area network band and the wireless local area network radio access technology band to a threshold,
disables communications of one selected from the wireless wide area network radio access technology wireless local area network band and the wireless local area network radio access technology band if the communications on the one selected from the wireless wide area network radio access technology wireless local area network band and the wireless local area network radio access technology band should be disabled,
monitors a location of the device, and
enables communication of the one selected from the wireless wide area network radio access technology wireless local area network band and the wireless local area network radio access technology band that has had its communications disabled if the location of the device has changed, wherein the signal metric comprises a wireless local area network radio access technology communication data error rate, and wherein the controller
computes the wireless local area network radio access technology communication data error rate on the wireless local area network radio access technology band,
compares the signal metric of one selected from the wireless wide area network radio access technology wireless local area network band and the wireless local area network radio access technology band to the threshold by comparing the wireless local area network radio access technology communication data error rate on the wireless local area network radio access technology band to a threshold,
determines communications on the wireless local area network radio access technology band should be disabled if the data error rate on the wireless local area network radio access technology band exceeds the threshold, and
disables communications wireless local area network radio access technology communications on the wireless local area network radio access technology band if the data error rate on the wireless local area network radio access technology band exceeds the threshold.

12. The apparatus according to claim 11,
wherein the signal metric comprises a band quality indicator, and
wherein the controller
computes the band quality indicator of wireless wide area network radio access technology communications on the wireless wide area network radio access technology wireless local area network band,
determines the communications on the wireless wide area network radio access technology wireless local area network band should be disabled if the band quality indicator of wireless wide area network radio access technology communications on the wireless wide area network radio access technology wireless local area network band is below the threshold, and
disables communications of the wireless wide area network radio access technology wireless local area network band if the band quality indicator of wireless wide area network radio access technology communications on the wireless wide area network radio access technology wireless local area network band is below the threshold.

13. The apparatus according to claim 11, wherein the controller disables communications on the one selected from the wireless wide area network radio access technology wireless local area network band and the wireless local area network radio access technology band and maintains communications on the other of the wireless wide area network radio access technology wireless local area network band and the wireless local area network radio access technology band if the communications on the one selected from the wireless wide area network radio access technology wireless local area network band and the wireless local area network radio access technology band should be disabled.

14. The apparatus according to claim 11, further comprising a user interface that enables and disables the wireless wide area network radio access technology wireless local area network band.

15. The apparatus according to claim 11, wherein the controller receives carrier aggregated data on a combination of the wireless wide area network band and the wireless wide area network radio access technology wireless local area network band.

16. The apparatus according to claim 11, wherein the wireless wide area network comprises a long term evolution-based network and the wireless local area network comprises an 802.11 frequency-based network.

17. The apparatus according to claim 11, wherein the wireless local area network frequencies comprise frequencies in a range of 4,915 MHz to 5,925 MHz.

18. The apparatus according to claim 11, wherein the wireless local area network base station using the wireless wide area network radio access technology and the wireless wide area network base station using the wireless wide area network radio access technology are base stations of a same service provider.

* * * * *